(12) United States Patent
Demontis et al.

(10) Patent No.: US 8,777,309 B2
(45) Date of Patent: Jul. 15, 2014

(54) LUMBAR SUPPORT FOR A VEHICLE BACKREST

(75) Inventors: Salvatore Demontis, Orbassano (IT); Gianluca Puleo, Orbassano (IT); Fabio Lopez, Orbassano (IT); Giorgio Masoero, Orbassano (IT)

(73) Assignee: C.R.F. Società Consortile per Azioni (IT)

( * ) Notice: Subject to any disclaimer, the term of this patent is extended or adjusted under 35 U.S.C. 154(b) by 49 days.

(21) Appl. No.: 13/482,402

(22) Filed: May 29, 2012

(65) Prior Publication Data

US 2012/0306248 A1  Dec. 6, 2012

(30) Foreign Application Priority Data

May 30, 2011  (EP) ..................................... 11425144

(51) Int. Cl.
*B60N 2/42*  (2006.01)
(52) U.S. Cl.
USPC ................................. 297/216.14; 297/216.13
(58) Field of Classification Search
USPC ................. 297/216.14, 216.13, 284.4, 216.1, 297/284.1
See application file for complete search history.

(56) References Cited

U.S. PATENT DOCUMENTS

| | | | | |
|---|---|---|---|---|
| 6,644,740 | B2* | 11/2003 | Holst et al. ................. | 297/284.4 |
| 7,425,036 | B2* | 9/2008 | McMillen ................... | 297/284.4 |
| 2005/0017555 | A1* | 1/2005 | Elliot ......................... | 297/284.4 |
| 2006/0152051 | A1* | 7/2006 | Colja et al. ................. | 297/284.4 |
| 2006/0261653 | A1* | 11/2006 | McMillen et al. ......... | 297/284.4 |
| 2006/0273643 | A1* | 12/2006 | McMillen .................. | 297/284.4 |

FOREIGN PATENT DOCUMENTS

| | | |
|---|---|---|
| EP | 2199147 A1 | 6/2010 |
| WO | WO-03/045732 A1 | 6/2003 |

OTHER PUBLICATIONS

"European Application Serial No. EP11425144, European Search Report dated Oct. 20, 2011", 2 pgs.

* cited by examiner

*Primary Examiner* — Milton Nelson, Jr.

(74) *Attorney, Agent, or Firm* — Schwegman Lundberg & Woessner, P.A.

(57) ABSTRACT

A lumbar support for a vehicle backrest has a rest member with a front surface shaped to support an area of a user's back, and an elastic member behind the rest member; the elastic member has an intermediate portion fixed to the rest member and two opposite ends fixed connected to a backrest frame, maintains the rest member in a rest position and can deform in response to a thrust of the user's back so as to let the rest member move between the rest position and a first position under normal conditions, and then abruptly towards a second position when a thrust of a user's back exceeds a given force value; the force/displacement curve of the elastic member has a slope which is between zero and a given threshold in the section between the first and the second positions, the threshold being equal to 0.5 [N/mm].

10 Claims, 2 Drawing Sheets

LUMBAR SUPPORT FOR A VEHICLE BACKREST

PRIORITY CLAIM AND RELATED APPLICATIONS

This application claims the benefit of priority under 35 U.S.C. Section 119 to European Patent Application Serial No. 11425144.0, filed May 30, 2011, which application is incorporated herein by reference in its entirety.

The present invention relates to a lumbar support for a vehicle backrest.

BACKGROUND OF THE INVENTION

In order to make vehicle seats comfortable, it is known to provide a lumbar support, i.e. a device arranged within a backrest and comprising a rest member which is coupled to a backrest frame and defines a shaped front surface placed at the lumbosacral area of the body occupying the seat.

Typically, the lumbar support also comprises an adjustment device, which is operable by the user for adjusting the shape and/or position of the rest member according to personal anatomy conformation of the body and/or personal comfort needs.

The tendency is also known in producing lumbar supports that contribute to the security of who occupies the seat, in the event of an accident with a rear impact against the vehicle. This type of lumbar support comprises a rest member that is able to backwardly move in the case of an accident with rear impact, so as to let the user's body approach the headrest of the seat in order to limit the so-called "whiplash" phenomena to the neck (this feature is commonly referred to as "anti-whiplash").

In this context, the solution proposed in the European Patent EP2199147 is extremely simple and has a low number of components. During operation, this solution enacts an over-centre activity, i.e. the rest member is connected to the seat frame by means of elastic members designed to keep the same rest member in an advanced balanced position or in a rear balanced position. In particular, the elastic members shift between two stable configurations when a certain strength threshold is exceeded. Practically, under normal driving conditions the elastic members tend to maintain the rest member in the advanced balanced position acting as a normal support spring, when the inertia thrust of the rest member exceeds the aforesaid threshold of strength, the elastic members shift back instantly displacing the rest member into the rear balanced position.

The tests on the solution just described have shown that, in use, there may be a shifting of the elastic members even in the absence of an actual accident, so that the driver must take the vehicle to maintenance to restore the elastic members to their original configuration and, accordingly, the rest member in the advanced balanced position.

SUMMARY OF THE INVENTION

The purpose of this invention is to make a lumbar support for a backrest of a vehicle, which will allow resolving the above explained issue in a simple and economic way, without changing the number of components provided in the known above described solution and effectively carrying out the "anti-whiplash" function.

According to the present invention, a lumbar support for a vehicle backrest is provided, as defined in claim 1.

BRIEF DESCRIPTION OF THE DRAWINGS

For a better understanding of the present invention a preferred embodiment is now described, purely by way of example without limitation, with reference to the attached drawings in which.

DETAILED DESCRIPTION OF THE INVENTION

Figure 1:
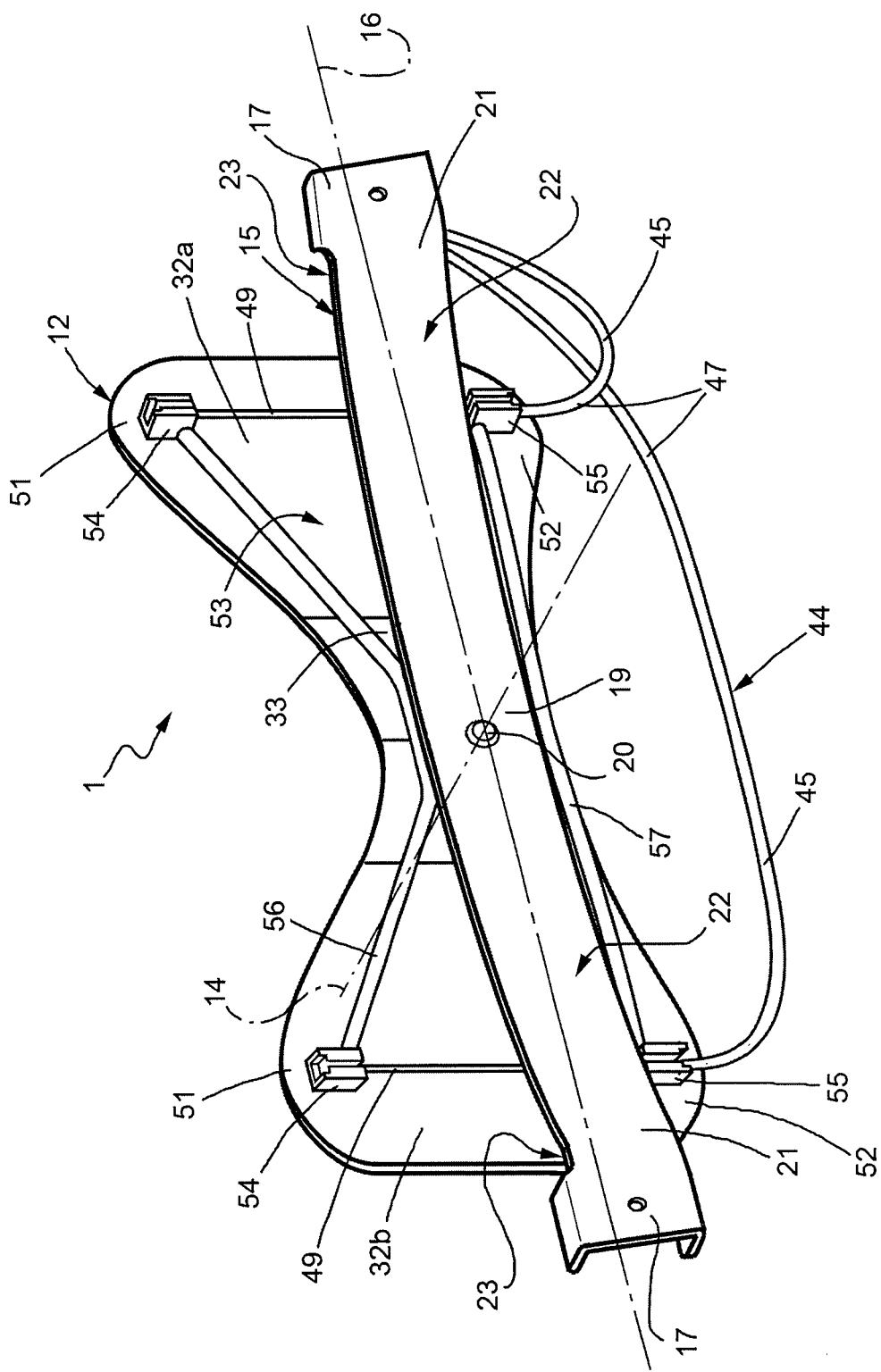
FIG. 1 is a rear perspective view of a preferred embodiment of the lumbar support for a vehicle backrest according to the present invention.

In FIG. 1, numeral 1 indicates a lumbar support for a vehicles seat backrest (not shown).

The lumbar support 1 is arranged at the lumbosacral area of a user's back who will sit on the seat, and comprises a rest member 12 having a front surface shaped to support the lumbar-sacral area of the user's back, in a direct or indirect way. In particular, the rest member 12 is defined by a plate formed in one piece of a plastic material and arranged behind a middle portion of the backrest padding.

The rest member 12 is coupled to a backrest frame by an elastic member 15, which causes, by its deformation, the rest member 12 to shift backwards from a rest position along a direction 14 parallel and opposite to the travelling direction of the vehicle, in response to a thrust of the user's back against the backrest.

In particular, as will be described here below, in case of an accident with rear impact, the elastic member 15 causes the rest member 12 to move backwards and, the back therefore, of a relatively large displacement in response to the inertial thrust of the user, therefore causing the user's head to approach the seat headrest (not shown), so avoiding the so-called "whiplash" phenomena to the neck ("anti-whiplash" function).

Figure 3:
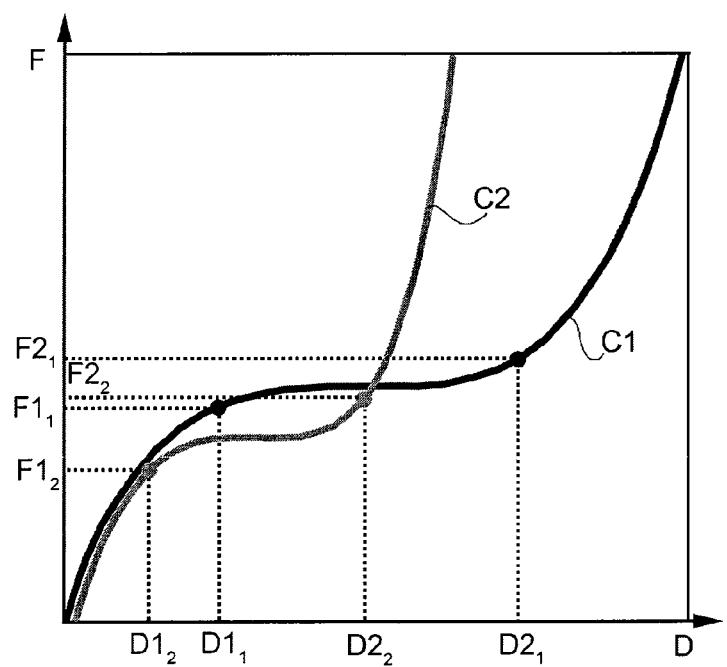
FIG. 3 is a Cartesian graph showing the characteristic curve of the elastic member of FIG. 2.

The shape, size and materials with which the elastic member 15 is made gives a particular characteristic curve to the elastic member 15, in order to execute said "anti-whiplash" function. The Cartesian graph of FIG. 3 shows two examples of said characteristic curve, indicated by the references C1, and respectively C2. In other words, the characteristic curves C1 and C2 represent the force F on the back on the seat and, therefore, the backwards reaction exerted by the lumbar support 1 for two different examples of the elastic member 15, depending on the displacement D of the rest member 12, measured along the direction 14 from the rest position, i.e. on the basis of the deformation of the elastic member 15.

The normal travelling conditions correspond to relatively small displacements from the rest position, corresponding to the origin of the Cartesian graph. The elastic member 15 opposes a relatively high increasing reaction, whereas the stiffness, which is equal to the slope of the characteristic curve C1, C2, is greater than zero and has a relatively high value.

With the increase of force F, the stiffness begins to decrease. When the force F reaches a value of F1, corresponding to a displacement value D, the stiffness falls below a certain threshold V, becoming therefore negligible. The threshold V is equal to 0.5 [N/mm].

The stiffness remains negligible, i.e. below the threshold V, up to a displacement value D2, which corresponds to a strength value F2. In the displacement range {D1, D2}, the elastic member 15 opposes an essentially constant reaction, as the difference (F1-F2) is relatively small, and the moving backwards of the rest member 12 is virtually instantaneous.

In the displacement range {D1, D2}, the characteristic curve C1, C2 defines an inflection. At the inflection, the curve C1, C2 reaches a slope of zero, so the stiffness vanishes. Then the stiffness increases again and, correspondingly, the reaction exerted by the lumbar support 1 increases.

The value F1 must be less than the thrust of inertia that occurs on the backrest in case of rear-end collision on the vehicle, but must not be too low for reasons of comfort, i.e. to avoid unwanted movements behind the value D1 under use in normal conditions: in particular, 50 [N]≤F1≤130 [N].

Also the value D1 must be sufficiently high to ensure a comfortable suspension under normal use conditions: preferably, D1≥10 [mm].

In addition, the movement range {D1, D2} must be wide enough to ensure the approaching of the user's head to the headrest in case of rear impact: in particular, (D2-D1)≥20 [mm].

As an example, for the characteristic curve C1, there is:
$F1_1$=115 [N];
$D1_1$=20 [mm];
$D2_1$=50 [mm].

For the characteristic curve C2, instead there is:
$F1_2$=75 [N];
$D1_2$=10 [mm];
$D2_2$=35 [mm].

The elastic member 15 is not over-centre: in every operating condition, it tends to bring the rest member 12 elastically towards its rest position, once the force F stops, as the characteristic curve C1, C2 has a single minimum point defined by the origin of the Cartesian axes. In other words, the characteristic curve C1, C2 has no descending tract, after the stiffness has been canceled in correspondence to the inflection.

The characteristic curve is applied by properly designing the elastic member 15 (size, shape and material), e.g., by way of successive attempts or by simulation programs of a known type loaded onto a computer. The design is accomplished in order to meet the above numerical standards for values D1, D2 and F1, and to respect the constraints imposed by the geometry of the backrest. The possible solutions are of course many.

The designing is particularly simple and the results are particularly reliable if the elastic member 15 is defined by a single leaf spring, which extends along a substantially horizontal direction 16.

Figure 2:
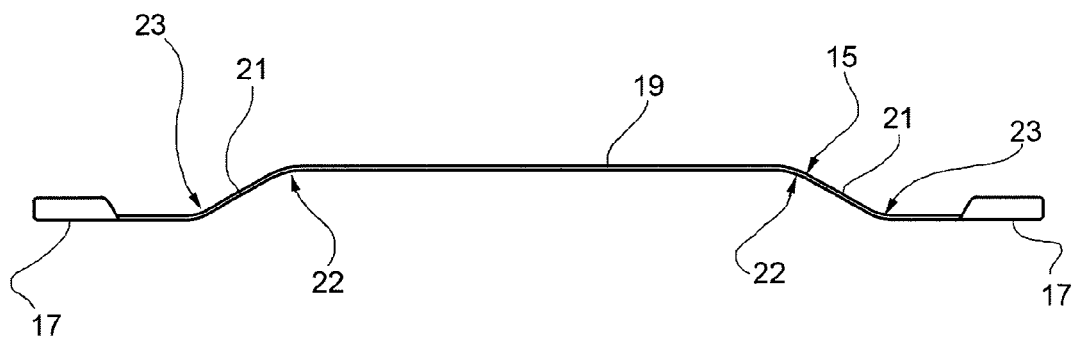
FIG. 2 is a plan view of an elastic member of the lumbar support of FIG. 1.

With reference to FIGS. 1 and 2, the elastic member 15 comprises two opposing ends 17 that are connected in a way not shown to the uprights of the backrest frame by brackets, rivets, self tapping screws or other rigid connection system types.

As can be seen, the elastic member 15 is a spring produced in one piece. However, the elastic member 15 is equivalent to two distinct leaf springs, each aligned along the direction 16.

The elastic member 15 is made of a metal or plastic material, and comprises a straight central portion 19, which is arranged behind and fixed to the rest member 12, e.g. by a rivet 20.

The portion 19 preferably has a length between 200 and 250 [mm], and a height comprised between 25 and 50 [mm].

The elastic member 15 comprises two curved side portions 21, which join the ends 17 to the portion 19 and each define in plan, two bends with opposite concavity 22, 23. The ends 17 comprise respective plates which extend in a plane parallel to that of the portion 19, so the bends 22, 23 of each portion 21 have equal radii. Preferably, the radii of the bends 22, 23 are comprised between 20 and 50 [mm].

The lumbar support 1 also comprises a user-operable control device 44 to deform the rest member 12 and improve the comfort for the support of the lumbar-sacral area of the user's back.

The rest member 12 comprises an intermediate portion 33 fixed to the portion 19 and two side wings 32a, 32b, which have a height greater than the portion 33 and protrude upwards and downwards with respect to the upper portion 33 with upper lobes 51 and lower lobes 52. Each of the wings 32a, 32b is flexible, so as to be able to approach the lobe 51 and the lobe 52 together under the action of the control device 44 and, therefore, form a frontal convexity.

The device 44 comprises two Bowden cables 45, which connect a manually-operable control device (not shown) to the back surface 53 of the rest member 12. Each Bowden cable 45 comprises a sheath 47 and a core 49, slidable within the sheath 47. The lower lobes 52 are fixed to the lower ends of the sheaths 47, while the upper lobes 51 are fixed to the ends of cores 49. Therefore, the cores 49 pass vertically in the spaces behind the wings 32a, 32b and in front of the portions 21 of the elastic member 15.

Preferably, the ends of the cores 49 and of the sheaths 47 are coupled to the lobes 51 and 52 by way of hooking members 54 and 55 respectively, which are produced in one piece of a plastic material with the rest member 12 and protrude from surface 53. In addition, two stiffening ribs 56, 57 are provided on the surface 53, to prevent the bending of the wings 32a, 32b around vertical axes. The ribs 56, 57 are also produced in one piece of a plastic material with the rest member 12, being arranged above and, respectively, below the elastic member 15, being arched with respective upwards and downwards concavity, and respectively joining together hooking members 54 and 55.

It is clear that by pulling the cores 49 with respect to the sheaths 47 by way of the control device, the lobes 51 and 52 vertically approach each other, for which the wings 32a, 32b deform, curving forward, so as to support with greater rigidity the backrest cushion, and therefore the area of the lumbar-sacral area of the back.

According to an alternative not shown, a single Bowden cable may be provided with a core 49 that forms a U or inverted U-shaped path between hooking members 54, 55.

The shape of the ribs 56, 57 can also be varied in order to optimize the back support of the occupant and the comfort of the seat.

As mentioned above, in the event of rear impact to the vehicle, the thrust of inertia of the user's back against the backrest support is transmitted to the rest member 12 and from the latter to the elastic member 15.

When the pressure of inertia exceeds the value F1, the elastic member 15 tends to release suddenly, allowing the rest member 12 to move backwards by an amount equal to the difference (D2-D1) (FIG. 3). In this way, the sudden backwards movement of rest member 12 allows the user's head to immediately approach the headrest, therefore limiting the so-called phenomena of "whiplash".

At the end of the collision, the lumbar support 1 will automatically return to the initial condition, i.e. the rest member 12 returns to its rest position.

From the foregoing it is evident that the actuation of the lumbar support 1 is effective thanks to the particular trend of the characteristic curve C1, C2. In addition, the lumbar support 1 returns automatically to the initial operating configuration, without breaking in the case of a simple rear-end collision, and therefore without costly maintenance or repair procedures.

The lumbar support 1 has an extremely low number of components, since the elastic member 15 performs the function of connecting the rest member 12 to the backrest frame, and the function of elastic support under normal driving conditions, along with the "anti-whiplash" safety function above described in the event of a rear impact accident.

The components of the lumbar support 1 are relatively simple to assemble; as the lumbar support 1 is also easy to mount on the frame of the backrest.

Finally, it appears clear that to the described and illustrated lumbar support 1 variations and modifications may be applied without extending beyond the scope of protection of the present invention, as defined in the appended claims.

For example, the shape and size of the rest member 12 may be different from those shown; and/or the rest member 12 may consist of several parts, instead of being produced by a plate in one piece; and/or the device 44 may be absent or different from that described by way of example.

Furthermore, a slight freedom of movement could be provided in the coupling area between the elastic member 15 and the rest member 12.

The invention claimed is:

1. A lumbar support for a vehicle backrest, the lumbar support comprising:
    a rest member having a front surface shaped to support an area of a user's back;
    an elastic member comprising:
        a) at least an attachment portion arranged behind said rest member and connected to an intermediate portion of said rest member, and
        b) two opposing ends designed to be connected to a backrest frame;
    said elastic member being designed to maintain said rest member in a rest position and to deform in response to a thrust of the user's back so as to backwardly release said rest member:
        between the rest position and a first position under normal use conditions, and
        from the first position to a second position when a thrust against the front surface exceeds a given force value;
    characterized in that the said elastic member has a characteristic force/displacement curve having a slope between zero and a given threshold in the section between the first and second positions; said threshold being equal to 0.5 N/mm.

2. The lumbar support according to claim 1, characterized in that the slope of said characteristic curve reaches zero in the section between the first and the second positions.

3. The lumbar support according to claim 1, characterized in that the shift between the first and second positions is at least equal to 20 mm.

4. The lumbar support according to claim 1, characterized in that the shift between the rest position and the first position is at least equal to 10 mm.

5. The lumbar support according to claim 1, characterized in that said elastic member is defined by a single spring.

6. The lumbar support according to claim 5, characterized in that said attachment portion is a straight horizontal portion having a length greater than or equal to 200 mm.

7. The lumbar support according to claim 5, characterized in that said single spring is a leaf spring.

8. The lumbar support according to claim 7, characterized in that said leaf spring has a height between 25 and 50 mm.

9. The lumbar support according to claim 7, characterized in that said leaf spring comprises two curved portions, which couple said attachment portion to said ends and each defining two bends having opposite concavities.

10. The support according to claim 9, characterized in that said bends have curvature radii between 20 and 50 mm.

* * * * *